Figure 1:
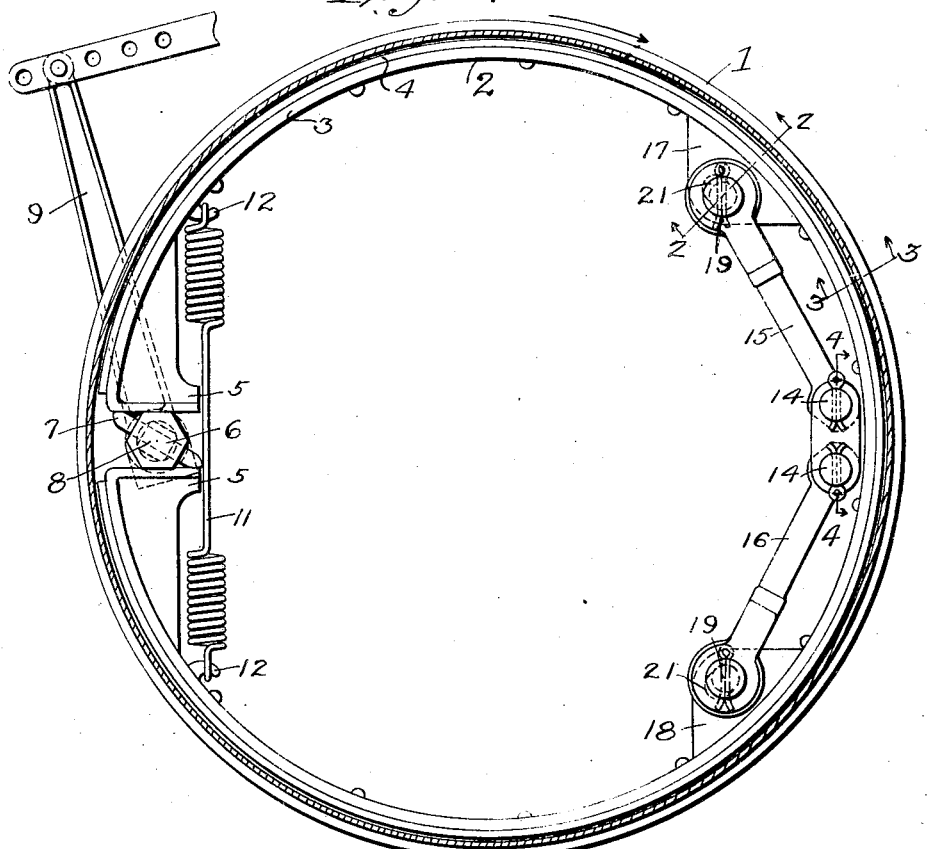

March 27, 1934.  E. R. WHITNEY  1,952,226
VEHICLE BRAKE
Filed Jan. 26, 1928

Inventor:
Eddy R. Whitney,
by his Attorneys,
Howson + Howson

Patented Mar. 27, 1934

1,952,226

UNITED STATES PATENT OFFICE 1,952,226

VEHICLE BRAKE

Eddy R. Whitney, Philadelphia, Pa.

Application January 26, 1928, Serial No. 249,719

11 Claims. (Cl. 188—78)

This invention relates to vehicle and other brakes, and the principal object of the invention is to provide, in a brake, means for obtaining a desired braking effect with a minimum of expended effort in applying the brakes. To this end advantage is taken to the greatest practicable extent of the self-applying or "servo" action, and the invention contemplates a novel brake construction whereby a predetermined desirable portion of the circumference of a substantially circular brake band is brought into cumulative braking cooperation with an associated brake drum regardless of the direction of the relative movement between the parts. The "predetermined desirable portion" of the brake band circumference is sufficient to provide a strong brake but not sufficient to invite a tendency for the brake to "grab".

Figure 2:
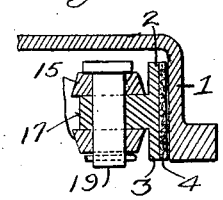
Figure 3:
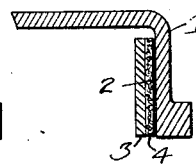
Figure 4:
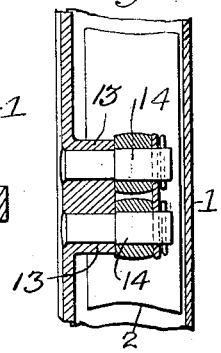
Figure 5:
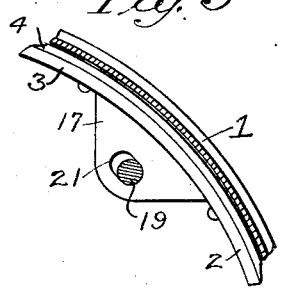

Referring to the drawing:

Figure 1 is a sectional elevation illustrating a brake made in accordance with my invention;

Figs. 2, 3 and 4 are, respectively, sections on the lines 2—2, 3—3 and 4—4, Fig. 1, and Fig. 5 is a fragmentary sectional view illustrating a detail of the construction.

Referring to the drawing, the brake structure comprises the usual rotary brake drum 1, and suitably mounted in the interior thereof a brake band 2. This band, as is customary, comprises an inner resilient backing member 3, preferably of flexible metal, and a lining 4 of suitable friction or brake-band material adapted to frictionally engage the inner surface of the drum 1. The band which forms substantially a complete circle is split at one side and has secured to the ends of the backing member 3 lugs 5, 5 between which is positioned a cam member 6 by means of which the brake band is expanded into contact with the drum. The cam 6, which in the present instance takes the form of a block 7 longitudinally slidable in a rotatable shaft 8, is actuated through a lever 9, through the medium of which the member 8 may be rotated to thereby cause the element 7 to force apart the lugs 5, 5 in obvious manner. The slidability of the element 7 in the shaft 8 renders this element self-adjustable between the lugs 5, 5 and makes for durability and accuracy of contact in the operating parts. Normally the brake band is held in a contracted position by a spring 11, the opposite ends of which are connected to the brake band through the medium of hooks 12, 12.

The brake band is anchored to a suitable stationary lug or anchor element 13 on the axle. The lug 13 has pivotally secured thereto, through the medium of a pair of pins or rivets 14, 14, links 15 and 16 which are also pivotally connected to lugs 17 and 18 projecting inwardly from the band 2. As shown in Fig. 2, the ends of the links 15 and 16 which attach to the lugs are bifurcated, and the connections between the bifurcated ends and the lugs are made by means of pins 19. In this instance the apertures in the lugs through which the pins 19 extend are, as shown in Figs. 1 and 5, elongated in a direction paralleling the circumference of the band 2, these slotted openings being designated by the reference numeral 21; and also as shown in Fig. 1, when the band is in the normal contracted condition, the pins 19 occupy the ends of the slots 21 nearest the anchor lug 13.

Assuming now that the brake drum 1 is rotated in the direction of the arrow at the top of Fig. 1, and that the brake band is expanded, it will be noted that the link 16 through its connection with the lug 18 and the anchor element 13 is called into play to resist the tendency of the brake band 2 to rotate with the drum. With the drum rotating in this direction, the link 15 is entirely inoperative by reason of the inability of the slot 21 in the lug 17 to hold the band in opposition to the movement of the drum. As a result, and by reason also of the positions of the lugs 17 and 18 on the band, more than half of the circumference of the brake band in frictional engagement with the brake drum is in cumulative circumferential compression due to addition of drum frictional drag to the pressure originally set up by the operating cam. The remainder of the circumference of the brake band, while in frictional engagement with the drum, is in subtractive compression due to subtraction of drum frictional drag from pressure originally set up by operating cam. When the drum 1 is rotating in the opposite direction, the same effect is obtained through the link 15 so that the brake functions the same in either direction.

I am aware that devices have been proposed whereby the same braking force may be had whether the brake drum is rotating in one direction or the other, as for example by anchoring the brake band at the midpoint so that approximately one-half of the band is used in either direction. It is desirable, however, to utilize more than one-half of the brake band in the braking operation, although not the entire area thereof. So far as I am aware, I was the first to provide a brake in which more than one-half of the brake band, but not all, is utilized as described for effective braking, regardless of the direction in which the drum is rotating when the brake is applied.

I claim:—

1. The combination with a rotary drum, of a brake member in the form of a flexible split annulus having a friction surface for contact with the surface of the drum, means for flexing the band to bring the friction surface to contact with the drum, and anchoring means engaging the band at a point intermediate the ends thereof, said anchoring means being operative under tension to hold the band against rotation with the drum while permitting free normal flexing of the band under the action of said flexing means.

2. The combination with a rotary drum, of a brake member in the form of a flexible split annulus having a friction surface for contact with the surface of the drum, means for flexing the band to bring the friction surface into contact with the drum, and anchoring means engaging the band at a point intermediate the ends thereof, said anchoring means comprising an arm anchored upon a pivot substantially parallel to the axis of the drum and pivotally attached to said band and being operative under tension to prevent rotation of the band with the drum.

3. The combination with a rotary drum, of a brake member in the form of a flexible split annulus having a friction surface for contact with the surface of the drum, means for flexing the band to bring the friction surface into contact with the drum, and anchoring means engaging the band at a point intermediate the ends thereof, said anchoring means comprising a member self-adjustably attached to the band and freely movable at the point of said attachment toward and from the surface of the drum contacted by the band and operative under tension to prevent rotation of the band with the drum.

4. The combination with a rotary drum, of a brake member in the form of a flexible split annulus having a friction surface for contact with the surface of the drum and supported in circumferential relation to the latter, resilient means normally retaining the band clear of the drum, means for flexing the band in opposition to said resilient means to bring the said friction surface in contact with the drum, and anchoring means for the band comprising a pair of arms respectively self-adjustably attached at their outer ends to the band at opposite sides of its longitudinal center and anchored at their adjacent inner ends upon fixed pivots permitting free movements of the said outer ends toward and away from the drum surface, said adjustable attaching means permitting limited free movement between the band and said arms whereby the effective anchorage of the band occurs at the said outer end of the arm furthest removed from the ends of the band in the direction of rotation of the drum.

5. The combination with a rotary drum, of a brake member in the form of a flexible split annulus having a friction surface for contact with the surface of the drum, means for flexing the member to bring the friction surface into contact with the drum, and a floating anchor for the member engaging the latter intermediate the ends thereof, said anchor being operative under tension to retain the member against rotation with the drum while permitting free movement of the member into engagement with the drum.

6. The combination with a rotary drum, of a brake member in the form of a flexible split annulus having a friction surface for contact with the surface of the drum, resilient means for normally retaining the member clear of the drum, means for flexing the member to bring the friction surface into contact with the drum, and a floating anchor for the member engaging the latter intermediate the ends thereof, said anchor being operative under tension to retain the member against rotation with the drum while permitting free movement of the member toward the drum under the action of said flexing means.

7. The combination with a rotary drum, of a brake member in the form of a flexible split annulus having a friction surface for contact with the surface of the drum, a resilient element engaging the member adjacent the ends thereof and constituting the sole means for normally retaining the member clear of the drum, means for flexing the member to bring the friction surface into contact with the drum, and a floating anchor for the member engaging the latter intermediate the ends thereof, said anchor being operative under tension to retain the member against rotation with the drum while permitting free movement of all portions of the member toward the drum under the action of said flexing means.

8. The combination with a rotary drum, of a brake having a friction surface for contact with the surface of the drum, a floating anchor for the brake engaging the latter intermediate the ends thereof, said anchor being operative under tension to retain the member against rotation with the drum while permitting free movement of the brake into engagement with the drum, resilient means normally retaining the brake clear of the drum, and means for actuating the brake to bring it into contact with the drum surface.

9. The combination with a rotary drum, of a divided brake member arranged in circumferential relation to said drum, resilient means for normally retaining said brake clear of the drum, means for adjusting the brake into contact with the drum, a floating anchor for said brake comprising tensionally operative elements engaging the brake on opposite sides of the longitudinal center thereof and freely movable toward and from the drum, and means providing limited free movement between said elements and the brake member whereby the effective anchorage of the brake occurs at that one of said elements furthest from the ends of the brake in the direction of rotation of the drum.

10. The combination with a rotary drum, of a brake member in the form of a flexible split annulus having a friction surface for contact with the surface of the drum, resilient means normally retaining said member clear of the drum, means for flexing said member to bring the friction surface into contact with the drum, a floating anchor for said member including elements freely movable in a direction toward and from the drum and engaging the brake member at opposite sides of the longitudinal center of the latter, said elements being operative under tension to prevent rotation of the brake member with the drum, and means providing limited free movement between the brake member and said anchor elements in a direction longitudinally of the member whereby the effective anchorage of the said member occurs at that one of said elements further from the end of the brake member in the direction of rotation of the drum regardless of the direction of rotation of the latter.

11. The combination with a rotary drum, of a brake arranged in circumferential relation to said drum and having free ends spaced one from the other, resilient means normally retaining the brake clear of the drum, means operative at the said ends of said brake for adjusting the brake into contact with the drum, a floating anchor for the brake including elements respectively engaging the latter at opposite sides of its longitudinal center and freely movable at said points of engagement toward and from the drum to permit a normal free adjustment of the brake under the action of said adjusting means, a relatively fixed anchor for said elements located adjacent the said longitudinal center of the brake, and means providing limited free movement between said elements and the brake in a direction longitudinally of the latter whereby irrespective of the direction of rotation of the drum the effective anchorage of the brake occurs at that one of said elements further from the end of the brake in the direction of rotation of the drum.

EDDY R. WHITNEY.